M. SÁRI.
KITCHEN UTENSIL.
APPLICATION FILED FEB. 18, 1914.
1,138,897.
Patented May 11, 1915.
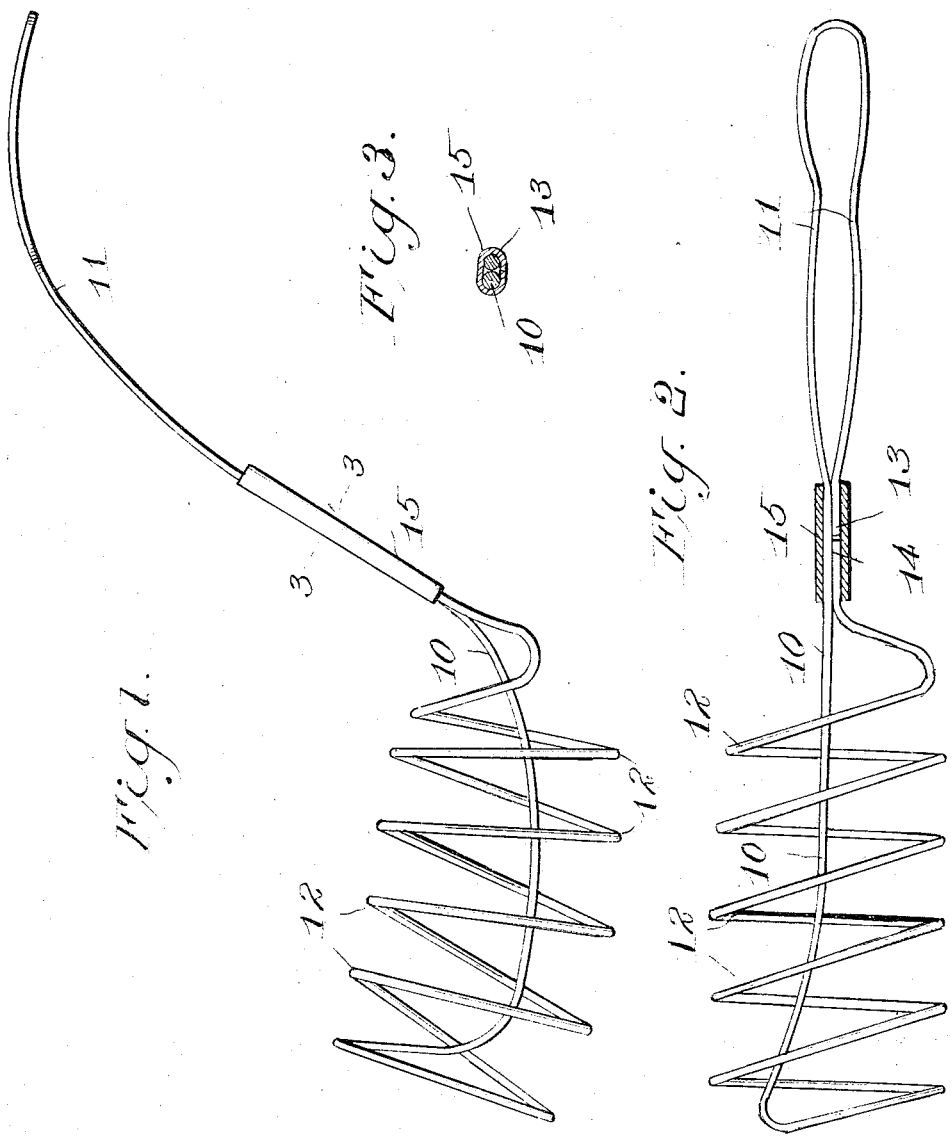

UNITED STATES PATENT OFFICE.

MARY SÁRI, OF CLEVELAND, OHIO.

KITCHEN UTENSIL.

1,138,897.  Specification of Letters Patent.  Patented May 11, 1915.

Application filed February 18, 1914. Serial No. 819,368.

*To all whom it may concern:*

Be it known that I, MARY SÁRI, a subject of the King of Hungary, residing at Cleveland, in the county of Cuyahoga and State of Ohio, have invented certain new and useful Improvements in Kitchen Utensils, of which the following is a specification.

This invention relates to certain new and useful improvements in kitchen utensils. According to my invention, I provide a kitchen utensil that may be utilized as an egg beater or cream whipper, and the primary object thereof is to construct the device of a single strand of resilient wire bent upon itself at one end to provide a handle and suitably coiled at the opposite end thereof to form the beater end, the handle being disposed at a proper angle to the beater end, to enable the beater end to reach the bottom of a bowl or other receptacle.

With the above and other objects in view that will appear as the nature of the invention is better understood, the same consists in the novel construction to be hereinafter more fully described and then claimed, reference being had to the accompanying drawing wherein like characters denote corresponding parts throughout the several views and wherein:—

Figure 1 is a side elevational view of a kitchen utensil constructed in accordance with my invention. Fig. 2 is a top plan view of the same with the sleeve in section, and, Fig. 3 is a cross-sectional view on line 3—3 of Fig. 1.

Referring to the drawing accompanying this application, and in which is shown a preferred embodiment of my invention, the reference numeral 10 designates the main strand of resilient wire. One end of the strand 10 is bent upon itself to provide a handle 11, the handle 11 being suitably curved relative to the main strand 10 as clearly shown in Fig. 1.

The opposite end of the main strand 10 is coiled about the main strand to provide the convolutions or beater elements 12, the end of the convolutions terminating at a point juxtaposed to the end 13 of the handle end 11 as at 14.

Mounted on the main strand 10 intermediate the handle 11 and the convolutions 12 is a sleeve member 15 that receives and houses the meeting ends 13 and 14 of the main strand 10.

The beater end of the device which consists of the convolutions 12 is suitably curved as shown in Fig. 1 while the handle 11 is disposed at a suitable angle relative to the beater end, to better enable the said beater end to contact the curved bottom of a bowl or other receptacle containing the material to be whipped.

By constructing the device of resilient wire material, the convolutions 12 when caused to engage the bottom of the receptacle in the beating operation will be permitted to freely move or be distorted and returned to its normal position when removed therefrom, and while I have shown and described the preferred embodiment of my invention, I do not wish to confine myself thereto, as various modifications and forms of the parts may be had without departing from the spirit and scope of the invention as claimed.

Having thus fully described my invention, what I claim as new and desire to secure by Letters Patent of the United States is:—

An egg-beater comprising a single piece of resilient wire, one end of which is bent upon itself to form a loop handle, while the other end is longitudinally curved and extended forward of said handle to constitute a body portion, and then formed into a series of convolutions surrounding said forwardly extending curved body portion in position to yield to conform to the shape of a bowl or other vessel, and having its rear end bent to longitudinally aline with the opposite end of the wire, and a sleeve securing the two alined ends of the wire in parallel engagement with the forwardly-extending body portion of the wire.

In testimony whereof I affix my signature in presence of two witnesses.

MARY SÁRI.

Witnesses:
 JOHN SÁRY,
 JULIA LESKO.